US007788938B2

United States Patent
Baruschke et al.

(10) Patent No.: US 7,788,938 B2
(45) Date of Patent: Sep. 7, 2010

(54) METHOD AND DEVICE FOR REGULATING A COOLANT CIRCUIT OF A VEHICLE AIR CONDITIONING SYSTEM

(75) Inventors: Wilhelm Baruschke, Wangen (DE); Armin Britsch-Laudwein, Renningen (DE); Karl Lochmahr, Vaihingen/Enz (DE)

(73) Assignee: Behr GmbH & Co. KG, Stuttgart (DE)

( * ) Notice: Subject to any disclaimer, the term of this patent is extended or adjusted under 35 U.S.C. 154(b) by 491 days.

(21) Appl. No.: 11/578,074

(22) PCT Filed: Apr. 18, 2005

(86) PCT No.: PCT/EP2005/004071

§ 371 (c)(1),
(2), (4) Date: Nov. 16, 2006

(87) PCT Pub. No.: WO2005/100061

PCT Pub. Date: Oct. 27, 2005

(65) Prior Publication Data

US 2007/0214811 A1    Sep. 20, 2007

(30) Foreign Application Priority Data

Apr. 19, 2004    (DE) .................. 10 2004 019 438

(51) Int. Cl.
F25D 17/04    (2006.01)
F25B 1/00    (2006.01)
F25B 41/00    (2006.01)
B60H 1/32    (2006.01)

(52) U.S. Cl. .............. 62/186; 62/115; 62/133; 62/207; 62/208; 62/209; 62/213; 62/215; 62/226; 62/228.1; 62/229

(58) Field of Classification Search ............ 62/186, 62/115, 133, 207, 208, 209, 213, 215, 228.1, 62/229, 226
See application file for complete search history.

(56) References Cited

U.S. PATENT DOCUMENTS

| 4,315,413 A | * | 2/1982 | Baker .................. 62/180 |
| 5,167,127 A | | 12/1992 | Ohtsu |
| 5,950,443 A | * | 9/1999 | Meyer et al. ............ 62/228.5 |
| 5,992,163 A | | 11/1999 | Baruschke et al. |
| 6,029,466 A | | 2/2000 | Wieszt |
| 6,035,649 A | | 3/2000 | Straub et al. |
| 6,073,457 A | | 6/2000 | Kampf et al. |

(Continued)

FOREIGN PATENT DOCUMENTS

DE    690 07 018 T2    6/1994

(Continued)

*Primary Examiner*—Frantz F. Jules
*Assistant Examiner*—Travis Ruby
(74) *Attorney, Agent, or Firm*—Muncy, Geissler, Olds & Lower, PLLC

(57) ABSTRACT

The invention relates to a method for regulating a coolant circuit (2) of a vehicle air conditioning system (4). According to said method, a target value (SW(VT)) for an evaporator temperature (VT) is predetermined in a base control circuit. Said value is used to determine a control value (U) for controlling the evaporator temperature (VT) by means of an evaporator temperature regulator (16). Said control value is also fed to a ventilator fan controller (26).

25 Claims, 3 Drawing Sheets

U.S. PATENT DOCUMENTS

| | | |
|---|---|---|
| 6,123,146 A | 9/2000 | Dias |
| 6,334,325 B1 | 1/2002 | Herpel et al. |
| 6,560,980 B2 * | 5/2003 | Gustafson et al. .............. 62/186 |
| 6,637,229 B1 | 10/2003 | Forrest et al. |
| 2002/0026801 A1 | 3/2002 | Yamashita |
| 2005/0081542 A1 * | 4/2005 | Braun et al. .................. 62/186 |
| 2006/0037332 A1 * | 2/2006 | Hwang et al. .................. 62/158 |

FOREIGN PATENT DOCUMENTS

| | | | |
|---|---|---|---|
| DE | 197 13 197 | A1 | 10/1998 |
| DE | 197 28 577 | C2 | 2/1999 |
| DE | 197 28 578 | C2 | 2/1999 |
| DE | 197 36 818 | A1 | 2/1999 |
| DE | 199 20 093 | C1 | 9/2000 |
| DE | 697 12 852 | T2 | 12/2002 |
| EP | 1 348 584 | A1 | 10/2003 |
| EP | 1348584 | A1 * | 10/2003 |

* cited by examiner

METHOD AND DEVICE FOR REGULATING A COOLANT CIRCUIT OF A VEHICLE AIR CONDITIONING SYSTEM

The invention relates to a method and a device for regulating a coolant circuit, for example what is referred to as an R134a or R744 coolant circuit, of an air conditioning system for a vehicle.

In order to make the passenger compartment more comfortable and to improve the thermal comfort in a vehicle, an air conditioning system is generally used which is formed from at least one heating and coolant circuit, an air conditioning unit and an air feeding means. Under unfavorable conditions, in particular at low rotational speeds of the vehicle engine, the feeding capacity of the air conditioning compressor or coolant compressor in the heating and coolant circuit, for example what is referred to as an R744 coolant circuit ($CO_2$), is, to a greater extent, small so that at high external temperatures and when there is a high degree of solar radiation and, for example, in addition when the vehicle stops at traffic lights, in a traffic jam or in a similar situation comfortable air conditioning of the passenger compartment is no longer possible. Furthermore, the cooling capacity is further adversely affected owing to insufficient ventilation of the condenser or gas cooler due to a lack of slipstream.

In order to avoid such inadequate air conditioning of the passenger compartment it is known to equip compressors with their own electric motor which can be regulated independently of the rotational speed of the vehicle engine. Such concepts are used in particular in vehicles with alternative drive technology, for example electric vehicles, hybrid vehicles or fuel cell vehicles which do not have an air conditioning compressor which is fixed to the drive engine. This concept can also be applied for conventional internal combustion engines if the on-board vehicle electrical network can make available the electrical power which is necessary for this. It is disadvantageous here that this concept is very costly in a vehicle with an internal combustion engine or can only be used for special vehicles.

The object of the invention is therefore to specify a method and a device for regulating a coolant circuit which permits the best possible air conditioning of the passenger compartment even when the vehicle is stationary.

In the method for regulating a coolant circuit of an air conditioning system for a vehicle, a set point value for a vaporizer temperature is predefined in a basic regulating circuit (also referred to as superordinate regulating system), said set point value being fed to a vaporizer temperature regulator in order to form a manipulated variable for regulating the vaporizer temperature.

The manipulated variable for regulating the vaporizer temperature is additionally used to control the condenser fan or gas cooler fan.

As a result, improved air conditioning of the passenger compartment is achieved in the stationary state of the vehicle or what is referred to as the idle stop mode. The gain in comfort is achieved purely by means of method technology (software module) without additional costs, weight or installation space.

The manipulated variable for regulating the vaporizer temperature is expediently used to control the compressor in a first range from 0% to 80%. In a second range of greater than 70% of the manipulated variable and thus of an overlap of, for example, 10%, the latter is fed to the fan controller. In other words: in the lower, first manipulated variable range the manipulated variable for regulating the vaporizer temperature is used to control the compressor. If, in this context, the predefined vaporizer temperature is not reached despite full formal modulation of the compressor, the manipulated variable rises automatically further into the upper second range, which then acts on the fan controller. In this way, at least the distance from the desired vaporizer temperature is reduced when the peripheral conditions are unfavorable.

In further preferred embodiments of the method, the first range of the manipulated variable for regulating the vaporizer temperature can also assume smaller values, for example of 0% to 60%, 65%, 70% or 75% or even somewhat larger values such as, for example, from 0% to 85% or 90%. With adaptation to this first range, the second range of the manipulated variable can start at values of greater than 60%, for example 65%, 70%, 75%, 80% or 85% and end at 100%. For the overlapping area of these ranges, values of greater than 0%, for example 5%, 10%, 15%, 20%, 25% or 30% prove advantageous.

Alternatively, the control error between the set point value for the vaporizer temperature and the actual value for the vaporizer temperature can be fed to the fan controller. That is to say the fan can also be controlled as a function of the control error. Furthermore, the instantaneous value of the velocity can be fed to the fan controller. In this context, the instantaneous value of the velocity is applied as an interference variable. As a result, even those travel states which lead to unfavorable air conditioning of the passenger compartment are taken into account at an early time.

Pilot control of the fan by means of the velocity allows the spontaneity of the regulating method to be increased, permitting a further increase in comfort. The described embodiment makes reference to stepless actuation of the compressor and fan. In further embodiments, both the fan and the compressor can be actuated in a stepped fashion as well as in a single step.

In addition to the control of the fan by means of the manipulated variable of the vaporizer temperature regulator, conventional coolant high pressure monitoring is implemented by means of the fan controller.

In one preferred embodiment of a device for regulating a coolant circuit of an air conditioning system, the latter comprises a basic regulating circuit for determining a set point value for the vaporizer temperature and a vaporizer temperature regulator which is connected downstream and whose manipulated variable guides both the control of the compressor and the control of the fan. The fan controller is preferably embodied here as a characteristic curve function of the manipulated variable, wherein in a first range from 0% to 80% the manipulated variable acts on a compressor controller, and in a second range of greater than 70% of the manipulated variable the latter acts on the fan controller.

In further preferred embodiments of the device, the first range of the manipulated variable for regulating the vaporizer temperature can also assume smaller values, for example from 0% to 60%, 65%, 70% or 75% or else somewhat larger values such as, for example, 0% to 85% or 90%. With adaptation to this first range, the second range of the manipulated variable can start at values of greater than 60%, for example 65%, 70%, 75%, 80% or 85% and end at 100%. Values of greater than 0%, for example 5%, 10%, 15%, 20%, 25% or 30% prove advantageous for the overlapping area of these ranges.

The fan controller is correspondingly designed to take into account further or alternative input signals. For example one of the inputs for controlling the fan is provided as a function of the control error between the set point value for the vaporizer temperature and the actual value for the vaporizer temperature. Another input is provided, for example, for controlling the fan as a function of the instantaneous value of the velocity.

The advantages which are achieved with the invention include, in particular, in the fact that without additional components such as an electric motor (for electric compressor), an increase in the cooling capacity and thus improved air conditioning of the passenger compartment is ensured even under unfavorable conditions, such as high external temperatures, strong solar radiation, by modified fan control for the condenser and the gas cooler. Such a solution provides advantages without an additional requirement for installation space and without additional weight of the coolant circuit.

The described fan controller always operates appropriately for the demand, i.e. in an optimum fashion in terms of energy; unnecessarily high rotational speeds of the fan are avoided by the velocity-dependent fan controller.

Exemplary embodiments of the invention are explained in more detail with reference to a drawing, in which.

Components which correspond to one another are provided with the same reference symbols in all the figures.

Figure 1:
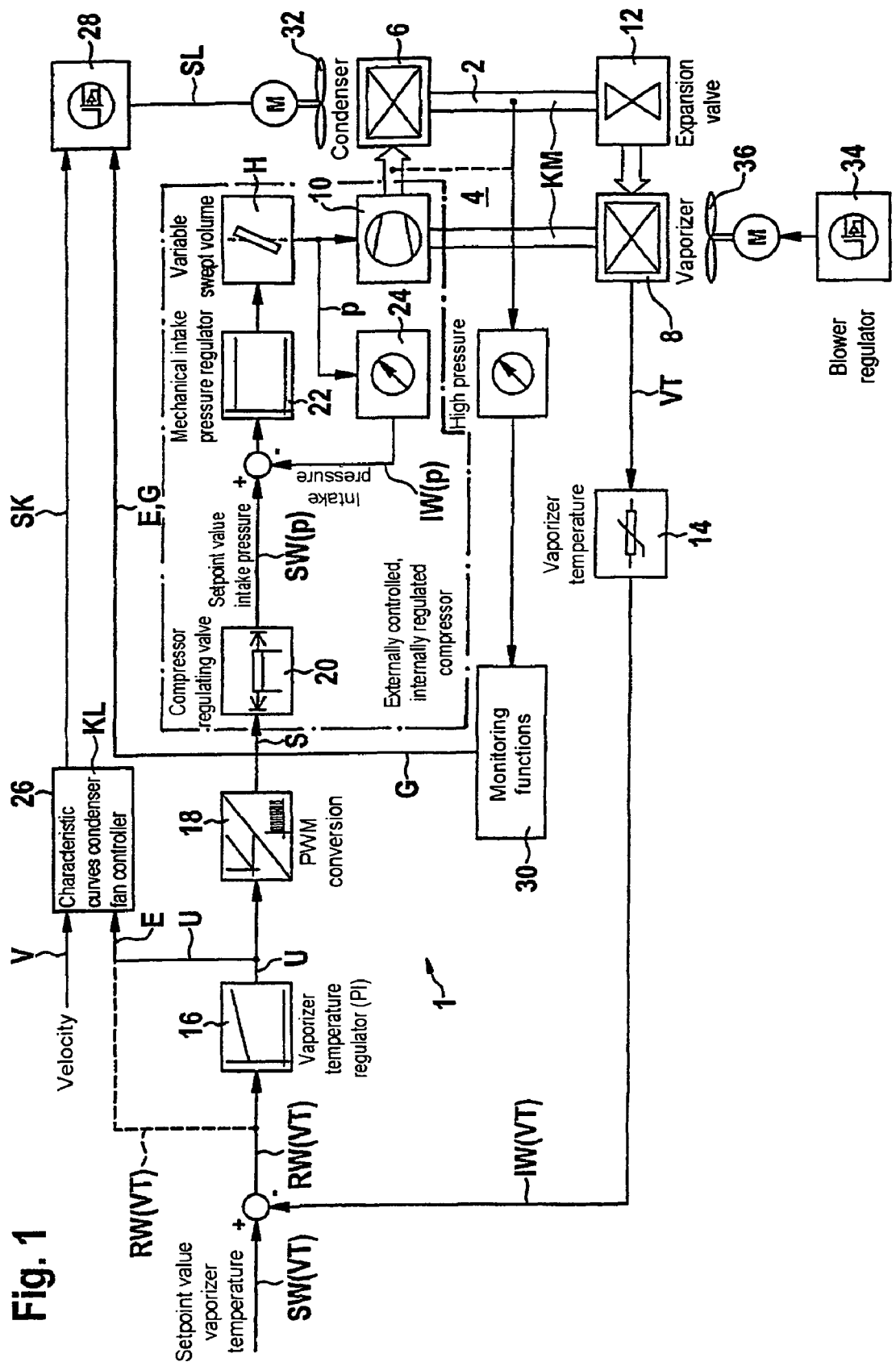
FIG. 1 is a schematic view of a device for regulating an R134a coolant circuit with a modified fan controller for a condenser for increasing the cooling capacity, in particular in the idle mode.

FIG. 1 illustrates a device 1 for regulating the vaporizer temperature using an R134a coolant circuit 2 of an air conditioning system 4 for a vehicle.

The coolant circuit 2 constitutes a closed system in which a coolant KM R134a is guided in a circuit from a compressor 10 to the condenser 6 and via an expansion valve 12 to the vaporizer 8. In the process, the coolant KM extracts heat from air flowing into the vehicle and discharges this heat to the ambient air. To do this it is necessary for the coolant KM to have a sufficiently large temperature difference with respect to the air. For this purpose, the coolant KM is cooled by means of a loss of pressure at the expansion valve 12 which is arranged in the coolant circuit 2; the cooling of the air flowing into the passenger compartment of the vehicle is carried out by the coolant KM absorbing heat in the vaporizer 8.

In detail, the coolant circuit 2 comprises the compressor 10 which is driven, for example, by the engine of the vehicle and has a variable swept volume H for compressing a gaseous coolant KM R134a. The compressor 10 sucks in the gaseous coolant KM from the vaporizer 8 via the expansion valve 12. The sucked-in gaseous coolant KM has a low temperature and a low pressure. The coolant KM is compressed by the compressor 10 and changes its physical state from gaseous to liquid with simultaneous heating. The gaseous and hot coolant KM is conducted to the condenser 6. The coolant KM is cooled by the air flowing into the condenser 6 to such an extent that it liquefies.

The coolant KM which is cooled in the condenser 6 is conducted via the expansion valve 12, which operates as a throttle, in order to be subsequently fed into the compressor 10 on the intake pressure side. In the process, the coolant KM relaxes so that the coolant KM cools to a great extent. The cooled coolant KM is sprayed by means of the expansion valve 12 into the vaporizer 8 where the coolant KM extracts the necessary vaporization heat from the air which enters, for example the fresh air. As a result, the air cools. The cooled air is conducted into the passenger compartment of the vehicle by means of a blower (not illustrated in more detail) and via air lines. The coolant KM is fed back to the compressor 10 on the intake pressure side downstream of the vaporizer 8.

In order to regulate the coolant circuit 2, the device 1 comprises an extended vaporizer temperature regulator, which will be described in more detail below.

A set point value SW(VT) for a vaporizer temperature VT is predefined, for example in a sliding fashion from 2° C. to 10° C., by a superordinate regulator (not illustrated here). The actual value IW(VT) for the vaporizer temperature VT is determined at the vaporizer 8 by means of a temperature sensor 14. A control error RW(VT) for the vaporizer temperature VT is determined from the difference between the set point value SW(VT) and the actual value IW(VT) for the vaporizer temperature VT. The control error RW(VT) is fed to a vaporizer temperature regulator 16, for example a PI regulator, which forms a manipulated variable U from it. The manipulated variable U of the vaporizer temperature regulator 16 is converted into a pulse-width-modulated actuation signal S by means of a pulse width modulator 18 by means of a transmission characteristic curve. The pulse-width-modulated actuation signal S is then fed to a regulating valve 20 of the compressor 10 in order to control the swept volume H.

In FIG. 1, an externally controllable compressor 10 with an integrated intake pressure regulator is used. This type of compressor is composed essentially of a compressor regulating valve 20 and a mechanical intake pressure regulator by means of the intake pressure regulator 22 and the pressure sensor 24 by virtue of the variable swept volume.

Components which are associated with the externally controlled and internally regulated compressor 10 are joined by a dot-dash line.

For sufficient air conditioning of the passenger compartment by increasing the cooling capacity in the coolant circuit 2, the manipulated variable U for regulating the vaporizer temperature VT is additionally fed to a fan controller 26. In the process, the fan controller 26 is guided, on the one hand, by the manipulated variable U of the vaporizer temperature regulator 16. On the other hand, the control error RW(VT) between the set point value SW(VT) for the vaporizer temperature (VT) and the actual value IW(VT) for the vaporizer temperature VT can alternatively be fed to the fan controller 26.

Furthermore, the instantaneous value of the velocity v can additionally be fed as further input variable E to such a fan controller 26 which is modified by a manipulated variable controller. In the process, the instantaneous value of the velocity v is applied as an interference variable. As a result, at the fan controller 26 in particular those driving states which lead to unfavorable air conditioning of the passenger compartment are taken into account. The fan controller 26 is embodied here as a characteristic curve function KL which will be described in more detail with reference to the diagrams in FIGS. 3 and 4. An actuation signal SK for a stepless or a stepped fan regulating system 28 is then formed by means of the characteristic curve KL of the fan controller 26.

In addition, a limiting value G of a conventional monitoring function 30, in particular high pressure monitoring, is implemented as input variable E for the fan regulating system 28. A manipulated variable SL for controlling a fan 32 for the condenser 6 is formed by means of the fan regulating system 28. The air which is cooled at the vaporizer 8 is fed via air lines to the vehicle cabin by means of the air conditioning blower 36 with a blower regulator 34.

Figure 2:
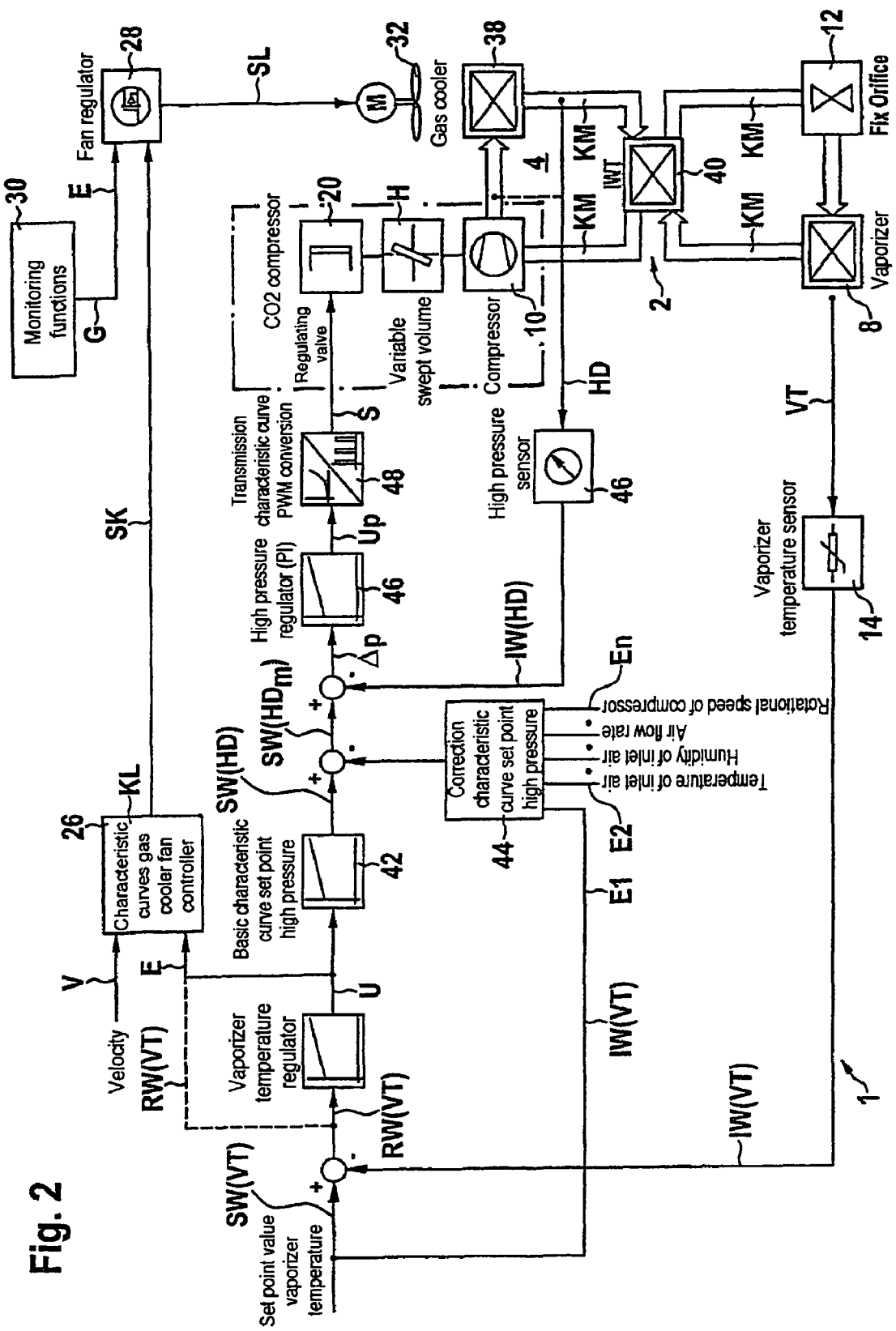
FIG. 2 is a schematic view of an alternative embodiment of a device for regulating an R744 coolant circuit with a modified fan controller for a gas cooler for increasing the cooling capacity, in particular in the idle mode.

FIG. 2 shows an alternative air conditioning system 4 with the coolant R744 which comprises a gas cooler 38, a vaporizer 8 and an intermediately connected internal heat exchanger 40 in which a circular process on which the air conditioning or cooling is based can also be implemented in reverse in order to operate the air conditioning system 4 so that the air conditioning system 4 also functions as a heat pump. The heat pump mode is not a subject matter of the application. The air conditioning system 4 for the coolant circuit 2 according to FIG. 2 will be described in more detail below.

The coolant circuit 2 constitutes a closed system in which a coolant KM carbon dioxide=R744 is circulated from the gas cooler 38 to the vaporizer 8 via the internal heat exchanger 40. In the process, the coolant KM extracts heat from air flowing into the vehicle and discharges it to the ambient air again. For this purpose it is necessary for the coolant KM to have a sufficiently large temperature difference with respect to the air. For this purpose, the cooling of the coolant KM takes place through loss of pressure at an expansion element 12 which is arranged in the coolant circuit 2; the cooling of the air which flows into the passenger compartment of the vehicle occurs as a result of heat being absorbed by the coolant KM in the vaporizer 8.

In detail, the coolant circuit 2 comprises the compressor 10 with a variable swept volume H for compressing the gaseous coolant KM. The compressor 10 sucks in the gaseous coolant KM. The sucked-in gaseous coolant KM has a low temperature and a low pressure. The coolant KM is compressed by the compressor 10 and simultaneously heated. The gaseous and hot coolant KM is conducted to the gas cooler 38. The coolant KM is cooled by the air flowing into the gas cooler 38.

The coolant KM which is cooled in the gas cooler 38 is conducted, in order to be subsequently fed into the compressor 10 at the intake pressure side, via the internal heat exchanger 40 and via the expansion valve 12 which operates as a throttle. In the process the coolant KM relaxes so that the coolant KM cools to a great extent. The cooled coolant KM is sprayed by means of the expansion element 12 into the vaporizer 8 where the coolant KM extracts the necessary vaporization heat from the air which enters, for example fresh air. As a result, the air cools. The cooled air is conducted into the passenger compartment of the vehicle by means of a blower (not illustrated in more detail) and via air lines. The coolant KM is fed back to the compressor 10 downstream of the vaporizer 8 via the internal heat exchanger 40 on the intake pressure side.

For reasons of stability and in order to avoid high pressure peaks in the coolant circuit 2, for example when performing a hot start or when there is a sudden rise in the rotational speed of the compressor 10, the device 1 for regulating the coolant circuit 2 comprises an extended vaporizer temperature regulating system which will be described in more detail below. The vaporizer temperature regulating system comprises a modified, subordinate coolant high pressure regulating system.

The set point value SW(VT) for the vaporizer temperature VT is predefined, for example in a sliding fashion from 2° C. to 10° C., by means of a superordinate regulating system (not illustrated here). The actual value IW(VT) for the vaporizer temperature VT is determined at the vaporizer 8 by means of a temperature sensor 16. A vaporizer temperature regulator 18, for example a PI regulator, is controlled by means of the difference between the set point value SW(VT) and the actual value IW(VT) for the vaporizer temperature VT. A set point value SW(HD) for the high pressure HD of the coolant KM in the coolant circuit 2 downstream of the gas cooler 38 is derived from the manipulated variable U of the vaporizer temperature regulator 18 by means of a basic characteristic curve 42.

Owing to the material properties of the coolant KM R744, there may, under certain circumstances, be a need for an additional correction characteristic curve 44 with which the set point value SW(HD), acquired from the basic characteristic curve 42, for the high pressure HD is modified in order to obtain a corrected or modified high pressure set point value SW(HDm). For example, the temperature, the humidity or the flow rate of the inlet air and/or the rotational speed of the compressor 10 are used as input variables E1 to En for correcting the set point value SW(HD) for the high pressure HD by means of the correction characteristic curve 44.

Furthermore, in order to determine the high pressure actual value IW(HD) a pressure sensor 46 is provided which determines the high pressure HD in the coolant circuit 2 downstream of the gas cooler 38. The difference between the high pressure set point value SW(HD) or SW(HDm) and the high pressure actual value IW(HD) is fed to a high pressure regulator 46 as a pressure difference value $\Delta p$ for control purposes. A manipulated variable Up for controlling the swept volume H of the compressor 10 by means of a regulating valve 20 is determined by reference to the pressure difference value $\Delta p$ using the high pressure regulator 46. The manipulated variable Up is converted into a pulse-width-modulated actuation signal S for the regulating valve 20 by means of a pulse width modulator 48 by reference to a transmission characteristic curve. The pulse-width-modulated actuation signal S is then fed to the regulating valve 20 of the compressor 10 in order to control the swept volume H. Components of the $CO_2$ compressor 10 are combined by a dot-dash line.

The modified fan controller 26 in the exemplary embodiment according to FIG. 2 corresponds to the embodiment according to FIG. 1.

Figure 3:
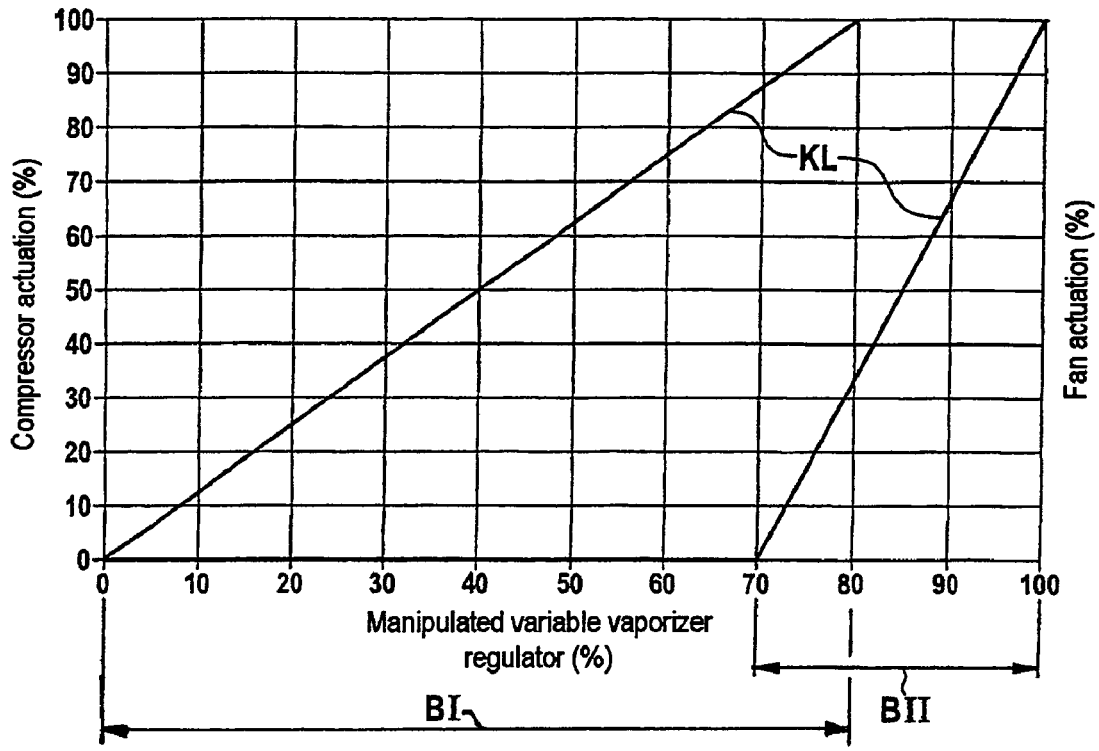
FIG. 3 is a diagram of the division of the manipulated variable for regulating the vaporizer temperature into manipulated variable ranges for actuating a compressor and a fan.
Figure 4:
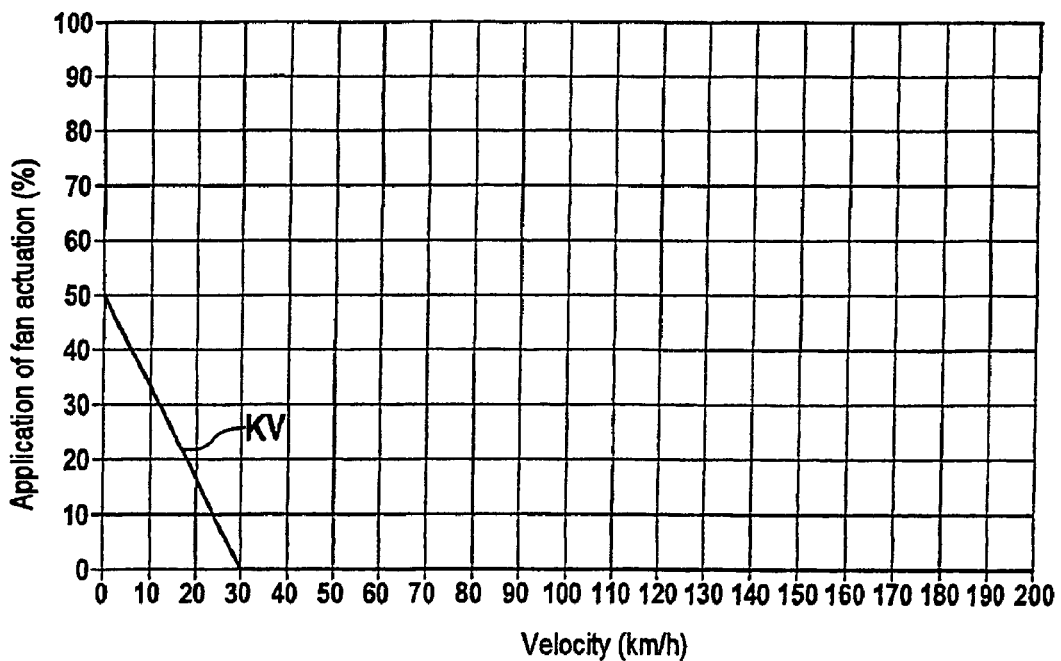
FIG. 4 is a diagram of the application of the instantaneous value of the velocity to the fan controller as an interference variable.

FIGS. 3 and 4, for example, show characteristic curves KL for the fan controller 26. The numerical values have been adopted by way of example. FIG. 3 shows the division of the manipulated variable range of the vaporizer temperature regulating system 16 into a first range BI for actuating the compressor 10 and into a second range BII for actuating the fan 32 for the gas cooler 38 according to FIG. 2 or the condenser 6 according to FIG. 1. In the process, the manipulated variable U is used to regulate the vaporizer temperature VT in the first range BI from 0% to 80% of the control of the compressor 10. In the second range BII of greater than 70% of the manipulated variable U the latter is used for the fan controller 26 for controlling the fan 32 for the condenser 6 or the gas cooler 38. In other words: in the lower, first manipulated variable range BI the manipulated variable U is used to regulate the vaporizer temperature VT for the compressor controller of the compressor 10. If, in the process, the predefined vaporizer temperature VT is not reached, the manipulated variable U rises into the upper, second range BII which then acts on the fan controller 26. In this way, at least the distance from the desired vaporizer temperature VT is reduced when the peripheral conditions are unfavorable.

FIG. 4 shows the characteristic curve KV for applying the velocity v as an interference variable to the characteristic curve KL for the fan controller.

The invention claimed is:

1. A method for regulating a coolant circuit of an air conditioning system for a vehicle comprising: providing a vaporizer temperature regulator; defining a set point value for a vaporizer temperature; determining a manipulated variable for regulating the vaporizer temperature based on a difference between the set point value and a measured vaporizer temperature of the vaporizer, feeding the manipulated variable to a compressor controller in order to regulate the vaporizer temperature in a first range from 0% to 80% of the manipulated variable without actuating a fan below 70% of the manipulated variable, and feeding the manipulated variable to a fan controller in order to regulate the vaporizer temperature in a second range of greater than 70% of the manipulated variable.

2. The method as claimed in claim 1, including guiding the fan controller by the manipulated variable.

3. The method as claimed in claim 1, including feeding the control error between the set point value for the vaporizer temperature and an actual value for the vaporizer temperature to the fan controller.

4. The method as claimed in claim 1, including feeding an instantaneous value of a velocity of the vehicle to the fan controller.

5. The method as claimed in claim 4, in which the instantaneous value of the velocity is applied to the fan controller as an interference variable.

6. The method as claimed in claim 1, including forming an actuation signal for a stepless or a stepped fan regulating system by the fan controller using a characteristic curve.

7. The method as claimed in claim 1, in which a high pressure monitoring function is implemented in order to control the fan.

8. The method as claimed in claim 7, including feeding the high pressure monitoring function as a control variable to the fan controller.

9. A device for regulating a coolant circuit of an air conditioning system for a vehicle having a basic regulating circuit for determining a set point value for a vaporizer temperature comprising: a vaporizer temperature regulator connected downstream of a vaporizer for determining a manipulated variable for regulating the vaporizer temperature based on a difference between the set point value and a measured vaporizer temperature of the vaporizer, and a fan controller guided by the manipulated variable of the vaporizer temperature regulator and connected downstream of the vaporizer temperature regulator, the fan controller being embodied as a characteristic curve function of the manipulated variable, wherein in a first range from 0% to 70% of the manipulated variable the manipulated variable acts on a compressor controller but not on the fan controller, in a second range from 70% to 80% the manipulated variable acts on the compressor controller and the fan controller, and in a third range of greater than 70% of the manipulated variable the manipulated variable acts on the fan controller.

10. The device as claimed in claim 9, wherein the fan controller is provided with a plurality of inputs.

11. The device as claimed in claim 10, wherein one of the inputs for controlling the fan is provided as a function of a control error between the set point value for the vaporizer temperature and the actual value for the vaporizer temperature.

12. The device as claimed in claim 10, wherein one of the inputs for controlling the fan is provided as a function of an instantaneous value of a velocity of the vehicle.

13. The device as claimed in claim 9, wherein a fan regulating system is connected downstream of the fan controller.

14. The device as claimed in claim 13, wherein a high pressure monitoring is applied to the fan regulating system.

15. The device as claimed in claim 9, wherein the fan controller is embodied as a software module or using analog circuit technology.

16. A method for regulating a coolant circuit of an air conditioning system for a vehicle, the system including a compressor, a condenser, a vaporizer and a fan for cooling the condenser, comprising:
 establishing a set point value for a vaporizer temperature;
 determining a manipulated variable based on a difference between an actual vaporizer temperature and the set point value, the manipulated variable being expressible as a percentage of a maximum;
 controlling an actuation percentage of the compressor based on the percentage of the manipulated variable without actuating the fan over a first range of percentages of the manipulated variable; and
 controlling an actuation percentage of the fan based on a value of the manipulated variable over a second range of percentages of the manipulated variable.

17. The method as claimed in claim 16 including controlling an actuation percentage of the fan and an actuating percentage of the compressor over a third range of percentages of the manipulated variable.

18. The method as claimed in claim 17 wherein the second range is 80% to 100% of the manipulated variable.

19. The method of claim 17 wherein the first range is 0% to 70% of the manipulated variable.

20. The method of claim 17 wherein the first range is 0% to 70% of the manipulated variable and the second range is 80% to 100% of the manipulated variable.

21. A device for regulating a coolant circuit of an air conditioning system for a vehicle, the air conditioning system including a compressor, a compressor controller, a condenser, a vaporizer, a fan adapted to cool the condenser, and a primary regulating circuit for establishing a set point for a temperature of the vaporizer, the device comprising:
 a vaporizer temperature regulator adapted to determine a manipulated variable based on a difference between the set point and an actual vaporizer temperature, the manipulated variable being expressible as a percentage of a maximum; and
 a fan controller for controlling an actuation percentage of the fan based on a value of the manipulated variable and a compressor controller for controlling an actuation percentage of the compressor based on a value of the manipulated variable,
 wherein the compressor controller controls the actuation percentage of the compressor based on the percentage of the manipulated variable over a first range of percentages of the manipulated variable and the fan controller controls the actuation percentage of the fan based on a value of the manipulated variable over a second range of percentages of the manipulated variable, wherein a portion of said first range overlaps a portion of said second range.

22. The device as claimed in claim 21 wherein the portion of the first range is greater than 70% of the manipulated variable.

23. The device as claimed in claim 22 wherein the second range is 80% to 100% of the manipulated variable.

24. The device as claimed in claim 22 wherein the first range is 0% to 70% of the manipulated variable.

25. The device as claimed in claim 22 wherein the first range is 0% to 70% of the manipulated variable and the second range is 80% to 100% of the manipulated variable.

* * * * *